(12) United States Patent
Jones

(10) Patent No.: US 6,363,323 B1
(45) Date of Patent: Mar. 26, 2002

(54) APPARATUS AND METHOD FOR MONITORING TRAVEL OF A MOBILE VEHICLE

(75) Inventor: Martin Kelly Jones, Dalton, GA (US)

(73) Assignee: Global Research Systems, Inc., Rome, GA (US)

(*) Notice: Subject to any disclaimer, the term of this patent is extended or adjusted under 35 U.S.C. 154(b) by 0 days.

(21) Appl. No.: 09/395,497

(22) Filed: Sep. 14, 1999

Related U.S. Application Data

(63) Continuation-in-part of application No. 09/163,588, filed on Sep. 30, 1998, which is a continuation-in-part of application No. 08/852,119, filed on May 6, 1997, which is a continuation of application No. 08/434,049, filed on May 2, 1995, now Pat. No. 5,623,260, which is a continuation of application No. 08/432,898, filed on May 2, 1995, now Pat. No. 5,652,010, which is a continuation-in-part of application No. 08/407,319, filed on Mar. 20, 1995, now abandoned, which is a continuation of application No. 08/432,666, filed on May 2, 1995, now Pat. No. 5,668,543, which is a continuation-in-part of application No. 08/407,319, filed on Mar. 20, 1995, now abandoned, which is a continuation-in-part of application No. 08/063,533, filed on May 18, 1993, now Pat. No. 5,400,020.

(60) Provisional application No. 60/115,755, filed on Jan. 13, 1999, and provisional application No. 60/039,925, filed on Mar. 7, 1997.

(51) Int. Cl.⁷ .................................................. G06G 7/76
(52) U.S. Cl. ...................... 701/213; 701/117; 701/210; 701/211; 701/200; 340/989; 340/991; 340/994; 542/397.07; 542/357.1; 542/457; 455/456
(58) Field of Search ................................ 701/201, 202, 701/207, 208, 209, 116, 117, 118, 119, 200, 210, 211, 213; 340/994, 989, 991, 992; 455/456, 517, 457, 403; 342/357.07, 357.08, 357.1, 457

(56) References Cited

U.S. PATENT DOCUMENTS

| | | | |
|---|---|---|---|
| 3,644,883 A | 2/1972 | Borman et al. | 340/23 |
| 3,845,289 A | 10/1974 | French | 235/151.2 |
| 3,934,125 A | 1/1976 | Macano | 235/150.2 |
| 4,220,946 A | * 9/1980 | Henriot | 340/994 |
| 4,297,672 A | 10/1981 | Fruchey et al. | 340/23 |
| 4,325,057 A | 4/1982 | Bishop | 340/539 |

(List continued on next page.)

FOREIGN PATENT DOCUMENTS

| | | | | |
|---|---|---|---|---|
| FR | 2 559 930 | 8/1985 | | G08G/1/12 |
| FR | 2674355 | 9/1992 | | |
| JP | 52066175 | 6/1977 | | |
| JP | 63288400 | 11/1988 | | G08G/1/12 |

*Primary Examiner*—Jacques H. Louis-Jacques
(74) *Attorney, Agent, or Firm*—Thomas, Kayden, Horstemeyer & Risley, LLP

(57) ABSTRACT

A vehicle tracking system includes a sensor (e.g., a GPS sensor) and a vehicle control unit (VCU) attached to a vehicle. The sensor determines the vehicle's location based on positioning signals received from a plurality of satellites. The VCU compares the vehicle's location to a predefined schedule. The predefined schedule includes a plurality of entries where each entry corresponds to a location along the vehicle's route of travel. Furthermore, each entry includes a location value indicating the location that corresponds with the entry and a time value indicating when the vehicle should be at the location. The VCU determines whether the vehicle is on schedule or off schedule by comparing the current location of the vehicle (as determined by the sensor) and the amount of time elapsed since the start of the route with the entries in the predefined schedule. If the vehicle is off schedule, then the VCU transmits a status message to a remote location indicating how much the vehicle is off schedule. A computer at the remote location is aware of the predefined schedule and assumes that the vehicle is on schedule unless a status message is received from the VCU. If a status message is received, the computer at the remote location determines the current location of the vehicle based on the status message.

34 Claims, 6 Drawing Sheets

U.S. PATENT DOCUMENTS

| | | | |
|---|---|---|---|
| 4,350,969 A | 9/1982 | Greer | 340/23 |
| 4,713,661 A | 12/1987 | Boone et al. | 340/994 |
| 4,791,571 A | 12/1988 | Takahashi et al. | 701/117 |
| 4,799,162 A | 1/1989 | Shinkawa et al. | 364/436 |
| 4,812,843 A | 3/1989 | Champion, III et al. | 340/905 |
| 4,956,777 A | 9/1990 | Cearley et al. | 701/24 |
| 5,021,780 A | 6/1991 | Fabiano et al. | 340/994 |
| 5,113,185 A | 5/1992 | Ichikawa | 340/995 |
| 5,121,326 A | 6/1992 | Moroto et al. | 701/212 |
| 5,122,959 A | 6/1992 | Nathanson et al. | 364/436 |
| 5,131,020 A | 7/1992 | Liebesny et al. | 379/59 |
| 5,144,301 A | 9/1992 | Jackson et al. | 340/994 |
| 5,155,689 A * | 10/1992 | Wortham | 455/456 |
| 5,168,451 A | 12/1992 | Bolger | 364/436 |
| 5,218,629 A | 6/1993 | Dumond, Jr. et al. | 379/59 |
| 5,223,844 A | 6/1993 | Mansell et al. | 342/357.07 |
| 5,299,132 A | 3/1994 | Wortham | 455/457 |
| 5,323,456 A | 6/1994 | Oprea | 379/375 |
| 5,351,194 A | 9/1994 | Ross et al. | 455/456 |
| 5,361,296 A | 11/1994 | Reyes et al. | 379/96 |
| 5,381,338 A | 1/1995 | Wysocki et al. | 701/207 |
| 5,394,332 A | 2/1995 | Kuwahara et al. | 364/449 |
| 5,398,190 A * | 3/1995 | Wortham | 455/456 |
| 5,400,020 A | 3/1995 | Jones | 340/994 |
| 5,432,841 A * | 7/1995 | Rimer | 379/59 |
| 5,444,444 A | 8/1995 | Ross | 340/994 |
| 5,448,479 A | 9/1995 | Kemner et al. | 701/23 |
| 5,461,374 A | 10/1995 | Lewiner et al. | 340/994 |
| 5,493,295 A | 2/1996 | Lewiner et al. | 340/994 |
| 5,493,694 A | 2/1996 | Vlcek et al. | 455/53.1 |
| 5,519,621 A | 5/1996 | Wortham | 364/460 |
| 5,526,401 A | 6/1996 | Roach, Jr. et al. | 379/59 |
| 5,539,810 A | 7/1996 | Kennedy, III et al. | 379/59 |
| 5,544,225 A | 8/1996 | Kennedy, III et al. | 379/59 |
| 5,546,444 A | 8/1996 | Roach, Jr. et al. | 379/59 |
| 5,579,376 A | 11/1996 | Kennedy, III et al. | 379/60 |
| 5,587,715 A | 12/1996 | Lewis | 342/357.03 |
| 5,594,650 A | 1/1997 | Shah et al. | 364/449.1 |
| 5,602,739 A * | 2/1997 | Haagenstad et al. | 701/117 |
| 5,623,260 A | 4/1997 | Jones | 340/994 |
| 5,648,770 A | 7/1997 | Ross | 340/994 |
| 5,652,707 A | 7/1997 | Wortham | 455/456 |
| 5,657,010 A | 8/1997 | Jones | 340/994 |
| 5,668,543 A | 9/1997 | Jones | 340/994 |
| 5,673,305 A | 9/1997 | Ross | 379/58 |
| 5,694,322 A | 12/1997 | Westerlage et al. | 705/417 |
| 5,699,275 A | 12/1997 | Beasley et al. | 364/514 R |
| 5,719,771 A | 2/1998 | Buck et al. | 455/456 |
| 5,724,243 A * | 3/1998 | Westerlage et al. | 455/456 |
| 5,736,940 A | 4/1998 | Burgener | 340/994 |
| 5,739,774 A * | 4/1998 | Olandesi | 340/994 |
| 5,751,245 A | 5/1998 | Janky et al. | 342/357.07 |
| 5,760,742 A | 6/1998 | Branch et al. | 342/457 |
| 5,771,455 A | 6/1998 | Kennedy, III et al. | 455/456 |
| 5,808,565 A | 9/1998 | Matta et al. | 340/994 |
| RE35,920 E | 10/1998 | Sorden et al. | 342/457 |
| 5,922,040 A * | 7/1999 | Prabhakaran | 701/117 |
| 5,987,377 A * | 11/1999 | Westerlage et al. | 701/204 |
| 6,006,159 A * | 12/1999 | Schmier et al. | 701/200 |

* cited by examiner

APPARATUS AND METHOD FOR MONITORING TRAVEL OF A MOBILE VEHICLE

CLAIM OF PRIORITY AND CROSS REFERENCE TO RELATED APPLICATIONS

This document claims priority to copending U.S. provisional application entitled "APPARATUS AND METHOD FOR MONITORING TRAVEL OF A MOBILE VEHICLE," assigned Ser. No. 60/115,755, and filed on Jan. 13, 1999. Further, this document claims priority to and is a continuation-in-part of copending U.S. patent application entitled "SYSTEM AND METHOD FOR ACTIVATION OF AN ADVANCE NOTIFICATION SYSTEM FOR MONITORING AND REPORTING STATUS OF VEHICLE TRAVEL," assigned Ser. No. 09/163,588 and filed on Sep. 30, 1998, and U.S. patent application entitled "ADVANCE NOTIFICATION SYSTEMS AND METHODS UTILIZING A COMPUTER NETWORK," assigned Ser. No. 08/852,119, and filed on May 6, 1997. Application Ser. No. 08/852,119 claims priority to (a)–(d) hereafter and is a continuation-in-part of (b)–(d) hereafter:

(a) provisional application entitled, "ADVANCE NOTIFICATION SYSTEM AND METHOD UTILIZING A COMPUTER NETWORK," filed Mar. 7, 1997 by M. K. Jones and assigned Ser. No. 60/039,925;

(b) nonprovisional application entitled, "ADVANCE NOTIFICATION SYSTEM AND METHOD UTILIZING PASSENGER-DEFINABLE NOTIFICATION TIME PERIOD," filed May 2, 1995 by M. K. Jones and assigned Ser. No. 08/434,049, now U.S. Pat. No. 5,623,260 to M. K. Jones that issued on Apr. 22, 1997;

(c) nonprovisional application entitled, "ADVANCE NOTIFICATION SYSTEM AND METHOD UTILIZING VEHICLE PROGRESS REPORT GENERATOR," filed May 2, 1995 by M. K. Jones and assigned Ser. No. 08/432,898, now U.S. Pat. No. 5,657,010 to M. K. Jones that issued on Aug. 12, 1997; and (d) nonprovisional application entitled, "ADVANCE NOTIFICATION SYSTEM AND METHOD UTILIZING PASSENGER CALLING REPORT GENERATOR," filed May 2, 1995 by M. K. Jones and assigned Ser. No. 08/432,666, now U.S. Pat. No. 5,668,543 to M. K. Jones that issued on Sep. 16, 1997;

where documents (b), (c), and (d) are each a continuation-in-part of the application entitled "ADVANCE NOTIFICATION SYSTEM AND METHOD UTILIZING A DISTINCTIVE TELEPHONE RING, " filed Mar. 20, 1995 by M. K. Jones and assigned Ser. No. 08/407,319, now abandoned, which in turn is a continuation-in-part of an application entitled "ADVANCE NOTIFICATION SYSTEM AND METHOD" filed May 18, 1993 by M. K. Jones et al. and assigned Ser. No. 08/063,533, now U.S. Pat. No. 5,400,020 to M. K. Jones et al. that issued on Mar. 21, 1995. All of the foregoing applications and patents are incorporated herein by reference.

BACKGROUND OF THE INVENTION

1. Field of the Invention

The present invention generally relates to data communications, tracking, and messaging systems and, in particular, to a vehicle monitoring apparatus and method for use in connection with a tracking system or an advance notification system that both tracks vehicles and gives advance notice of impending arrivals of vehicles at particular stops. The vehicle monitoring apparatus and method of the present invention essentially track and report the status of a mobile vehicle as the vehicle travels.

2. Related Art

For at least the purposes of allowing advance preparation and scheduling, it would be desirable to know, in advance and with substantial accuracy, the expected arrival time of a mobile vehicle (for example but not limited to, a bus, truck, train, ship, plane, aircraft, etc.) at a particular location, such as a stop along a predefined route or a destination.

For example, consider a commercial bus station. A person picking up a friend or relative at the commercial bus station usually calls the bus station to find out the approximate arrival time (information which is oftentimes unavailable or unreliable) and/or arrives at the bus station prior to the scheduled arrival time of the bus, hoping that the bus is not significantly delayed. With knowledge of accurate arrival information in advance, adjustments can be made to one's schedule to avoid having to wait extended periods for a vehicle.

Another example involves school children that ride school buses. The arrival times of school buses at scheduled stops can be significantly affected by many factors, such as maintenance problems, rush hour traffic, congested urban/suburban conditions, and adverse weather. As a result, school children typically wait at bus stops for long periods of time, oftentimes in adverse weather conditions, on unlit street corners, or in hazardous conditions near busy or secluded streets. An advance notification system that would inform the students of the school bus's proximity would be desirable so that students can avoid having to wait for the school bus at the bus stop for extended time periods.

Yet another example involves the commercial overnight package delivery industry, wherein packages are delivered many times on a tight schedule. Customers oftentimes wait on delivery of important time-critical packages, not knowing precisely when the delivery will occur. An advance notification system that can inform a customer of the precise arrival time of a delivery vehicle would be desirable in order to improve customer service and to allow the customer to better schedule a pickup of a delivered item.

In order to alleviate the arrival time problem in the context of school buses, student notification systems have been developed in the past that use a wireless transmitter on each bus and a compatible wireless receiver inside each student home. U.S. Pat. No. 4,713,661 to Boone et al. and U.S. Pat. No. 4,350,969 describe systems of this type. When the school bus and its on-board transmitter come within a certain range of a particular home receiver, the transmitter sends a signal to notify the student that the school bus is nearby. While such notification systems work satisfactory under certain circumstances, nevertheless, these systems are limited by the range of the transmitters and require the purchase of relatively expensive receivers for each student. In addition, such systems provide little flexibility for providing additional information to the students, such as notifying them of the delayed arrival of a bus or alternative bus route information.

Thus, a heretofore unaddressed need exists in the industry for better systems, apparatuses, and methods for accurately tracking and/or reporting the status of mobile vehicles as the vehicles travel.

SUMMARY OF THE INVENTION

The present invention overcomes many inadequacies and deficiencies of the prior art, as discussed hereinbefore. In general, the present invention provides an automated computer-based apparatus and method for efficiently monitoring travel of a vehicle along a predetermined route. The apparatus and method may be used in connection with, for example but not limited to, a tracking system or an advance notification system.

In a broad sense, the automated computer-based apparatus of the present invention includes a sensor, a storage device, a communications device, and a computer processor. The sensor, for example, a satellite receiver, determines a current location value indicating a current location of a mobile vehicle. The storage device includes historical travel data pertaining to the vehicle schedule along the route. The historical travel data comprises a plurality of predetermined location values corresponding respectively with a plurality of locations along a predetermined route of travel of the mobile vehicle. The predetermined location values are respectively associated with time values stored in the storage device. The processor uses one of the plurality of predetermined location values (along with its associated time value), a current time, and a current location value received from the sensor to determine whether the vehicle is off schedule. If the vehicle is off schedule by at least a predefined amount, the processor causes the communications device to transmit a message to a remote computer, associated with a tracking system or an advance notification system, indicating that the vehicle is off schedule by a specified time and/or distance. In the context of an advance notification system, the remote computer is thus enabled to change when a party is notified of an impending arrival of the vehicle, e.g., called via a telephone, based on the off schedule message transmitted via the communications device on the vehicle.

In accordance with another feature of the present invention, the processor on the vehicle may be configured as an expert system. In this regard, it may be configured to create and maintain a vehicle schedule, or historical data, on-board for the vehicle by (1) periodically determining locations of the mobile vehicle, (2) storing a location value in the storage device for each of the locations, (3) determining a time value for each location, and (4) storing the time values in the storage device. Using the foregoing historical data, the vehicle apparatus can determine whether it is on or off schedule by comparing a current location and time with one or more historic locations and times.

In accordance with another feature of the present invention, the processor may be configured to monitor the deviation of the mobile vehicle from a predefined route and to transmit an alarm message to a remote computer when the processor determines that the vehicle has deviated from the predefined route by a predefined amount (distance, time, etc.).

In accordance with another feature of the present invention, the communications device associated with the apparatus on the vehicle may be configured to selectively communicate data to a remote computer via either the voice channel and/or a control channel of a cellular network. In communicating over the control channel, the communications device can alter a mobile identification number (MIN) or an electronic serial number (ESN) to transfer data, or the communications device can append data to the end of a feature request. Use of the control channel can significantly reduce costs.

It should be emphasized that the features of the present invention can be employed for tracking and reporting on the status of virtually any type of mobile vehicle, or mobile object, including but not limited to, a bus, truck, train, ship, plane, aircraft, human being, animal, etc.

Other features and advantages of the present invention will become apparent to one skilled in the art upon examination of the following detailed description, when read in conjunction with the accompanying drawings. It is intended that all such features and advantages be included herein within the teachings of the present invention, as set forth herein and as sought to be protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
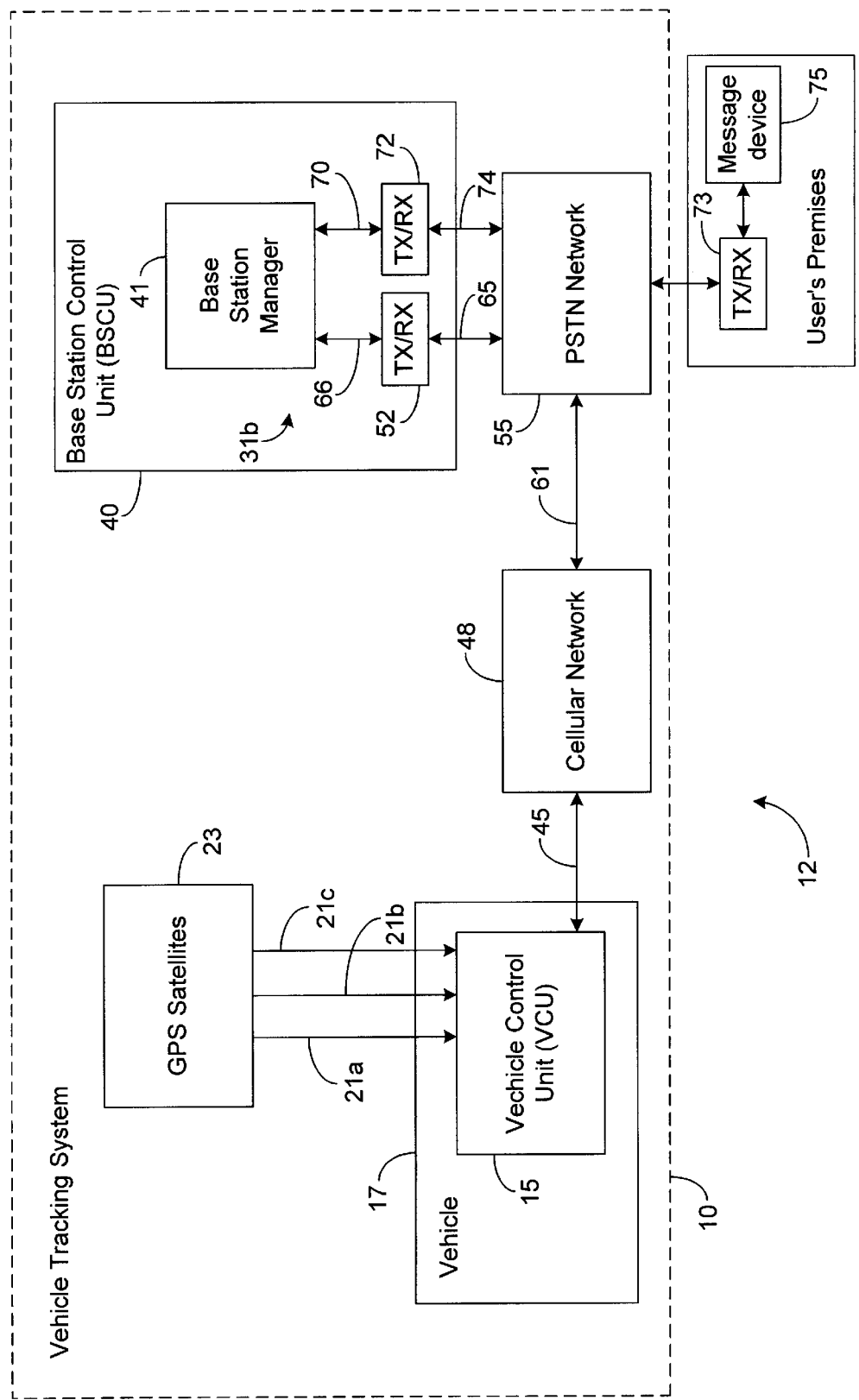
FIG. 1 is a block diagram illustrating a vehicle tracking system employed within the context of an advance notification system in accordance with the preferred embodiment of the present invention.

FIG. 1 depicts an automated vehicle tracking system 10 illustrating the principles of the present invention. As shown by FIG. 1, the vehicle tracking system 10 is preferably employed within the context of an automated advance notification system 12 that automatically provides advance notice of impending arrivals of vehicles at destinations or other locations. However, it is possible to utilize the vehicle tracking system 10 independent of the notification system 12 in applications where the transmission of a notification message (which will be described in further detail hereinafter) is not desired.

As depicted in FIG. 1, a vehicle control unit (VCU) 15 is disposed on a mobile vehicle 17, which is capable of transporting the VCU 15 over various distances. For example, vehicle 17 can be any movable object or thing, including but not limited to, an automobile, an airplane, a train, a boat, a human being, an animal, or any other thing capable of moving across or through the Earth's surface and/or atmosphere.

In the preferred embodiment, the vehicle 17 is a delivery vehicle for delivering items to a destination or for picking up items at a destination. Please note that items can include many various types of packages or goods to be delivered or picked up. Furthermore, items can also include persons to be picked up or delivered, such as when a bus picks up and/or delivers passengers at different bus stops. Preferably, the vehicle 17 travels along a predetermined route in making its deliveries, and the vehicle 17 may make numerous stops along its route in order to deliver or pick up different items at different locations.

Vehicle Control Unit

Figure 2:
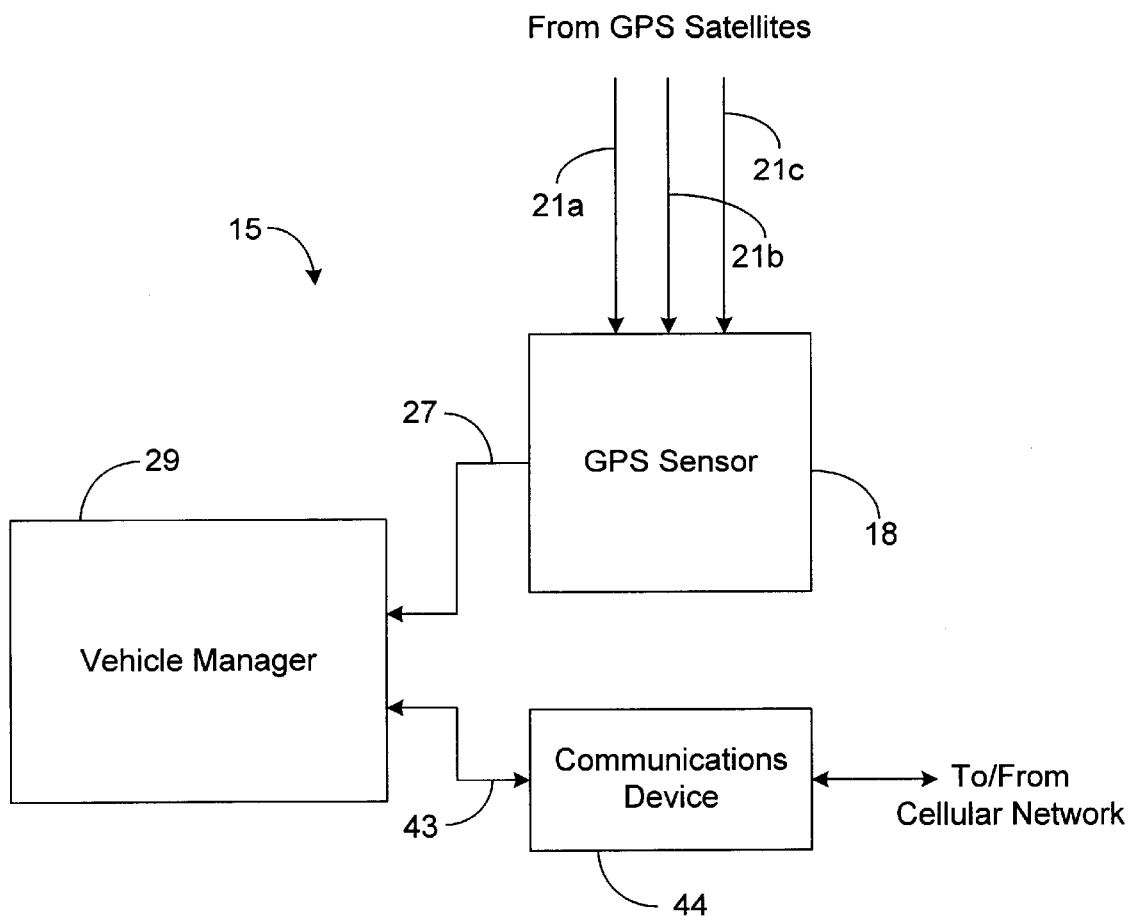
FIG. 2 is a block diagram illustrating an implementation of the vehicle control unit of FIG. 1 in accordance with the preferred embodiment of the present invention.

A more detailed view of the VCU 15 is depicted in FIG. 2. A sensor 18 within VCU 15 is configured to determine the location of the sensor 18 relative to a predetermined reference point. In the preferred embodiment, sensor 18 is a global positioning system (GPS) sensor, although other types of positioning systems and/or sensors are also possible. For example, other types of sensors 18 that may be used to implement the principles of the present invention include, but are not limited to, sensors 18 associated with GLONASS, LORAN, Shoran, Decca, or TACAN. The GPS sensor 18 of the preferred embodiment is configured to receive signals 21a–21c from a plurality of GPS satellites 23, and as known in the art, sensor 18 is designed to analyze signals 21a–21c in order to determine the sensor's location or coordinate values relative to a predetermined reference point. For example, in the preferred embodiment where sensor 18 is a GPS sensor, the sensor 18 determines the sensor's location values relative to the Earth's zero degree latitude and zero degree longitude reference point, which is located at the intersection of the Equator and the Prime Meridian. U.S. Pat. No. 5,781,156 entitled "GPS Receiver and Method for Processing GPS Signals" and filed on Apr. 23, 1997 by Krasner, which is incorporated herein by reference, discusses the processing of GPS signals 21a–21c received from GPS satellites 23 in order to determine the sensor's location values. Since the sensor 18 is located within VCU 15, the location values determined by the sensor 18 are assumed to match the location values of the vehicle 17 and the VCU 15.

It should be noted that the term "location value" shall be defined herein to mean any value or set of values that may be used to determine a location of a point on the Earth or within the Earth's atmosphere. This value may be a coordinate value (i.e., grid value), polar value, vector value, or any other type of value or values known in the art for indicating locations of points.

Sensor 18 is designed to transmit a signal 27 to vehicle manager 29 indicating the vehicle's current location values. Vehicle manager 29 is configured to receive signal 27 and to monitor the location of the vehicle 17 over time by processing multiple signals 27. The vehicle manager 29 can be implemented in software, hardware, or a combination thereof. In the preferred embodiment, as illustrated by way of example in FIG. 3, the vehicle manager 29 of the present invention along with its associated methodology is implemented in software and stored in computer memory 30a of a computer system 31a.

Note that the vehicle manager 29 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the vehicle manager 29 may be magnetically stored and transported on a conventional portable computer diskette.

Figure 3:
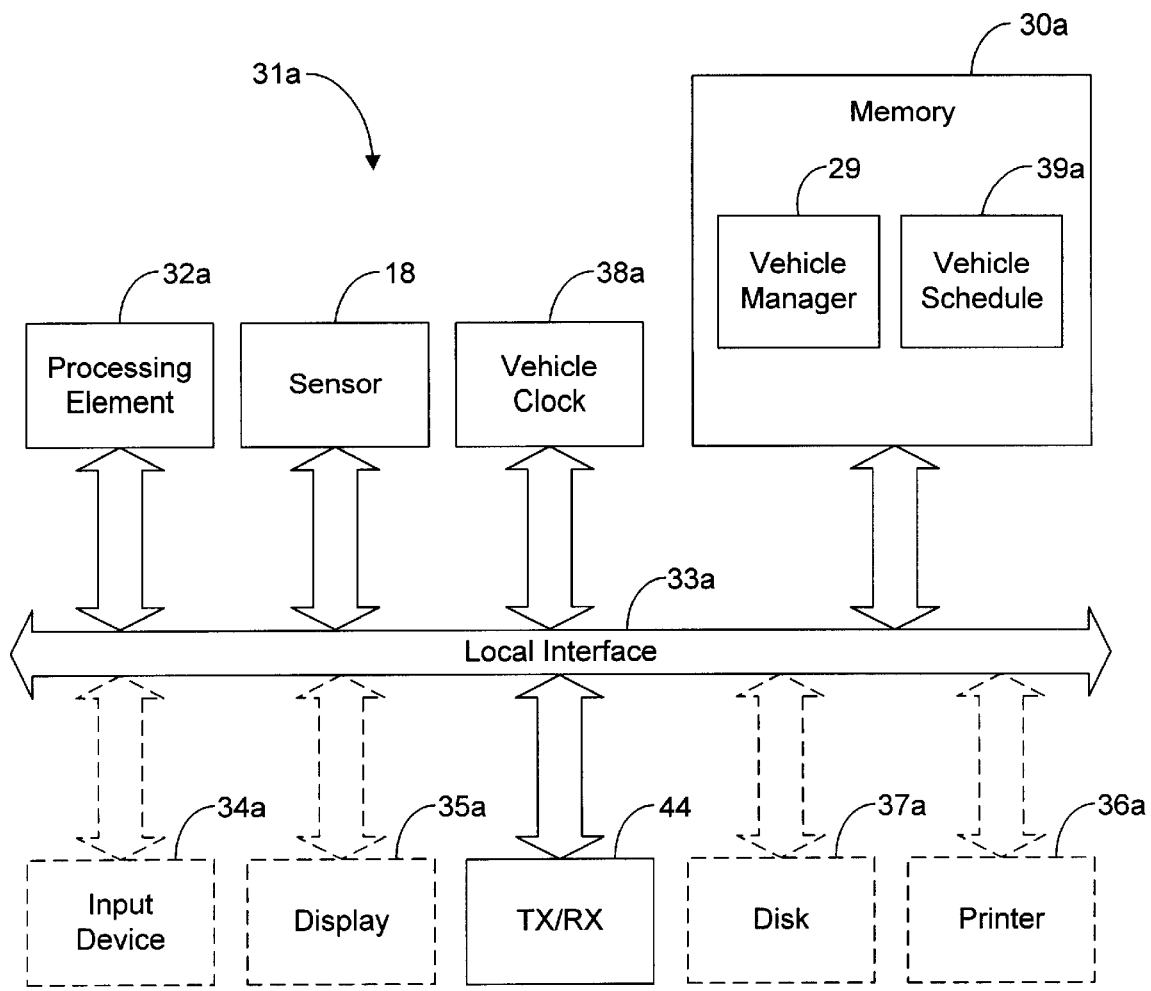
FIG. 3 is a block diagram illustrating a computer implementing the functionality of the vehicle manager of FIG. 1 in accordance with the preferred embodiment of the present invention.

The preferred embodiment of the computer system 31a of FIG. 3 comprises one or more conventional processing elements 32a, such as a digital signal processor (DSP), that communicate to and drive the other elements within the system 31a via a local interface 33a, which can include one or more buses. Furthermore, an input device 34a, for example, a keyboard or a mouse, can be used to input data from a user of the system 31a, and screen display 35a or a printer 36a can be used to output data to the user. A disk storage mechanism 37a can be connected to the local interface 33a to transfer data to and from a nonvolatile disk (e.g., magnetic, optical, etc.). It should be noted that input device 34a, display 35a, printer 36a, and disk 37a are optional and are not a part of the preferred embodiment, although other embodiments may include these features.

The vehicle manager 29 is preferably configured to maintain a predefined schedule 39a, referred to herein as the "vehicle schedule 39a," within memory 30a. The predefined vehicle schedule 39a corresponds with a route of travel for the vehicle 17. In this regard, the predefined vehicle schedule 39a stored in memory 30a includes data defining locations along the vehicle's intended route of travel. Furthermore, each location is associated with a particular time value indicating when the vehicle 17 is expected to reach the associated location. Each time value along with its associated location defines an entry in the vehicle schedule 39a.

In the preferred embodiment, the time value corresponds to the estimated amount of time that should lapse between the time that the vehicle 17 starts its intended route and the time that the vehicle 17 reaches the associated location along the route. However, other time values may be used without departing from the principles of the present invention. For example, the time of day that the vehicle 17 is expected to reach the associated location may be used. Any time value that indicates when the vehicle 17 is expected to reach the associated location is sufficient for the purposes of the present invention. However, for illustrative purposes, the present invention will be discussed hereinafter assuming that the time values in the entries of the vehicle schedule 39a conform to the preferred embodiment (i.e., that the time values represent the amount of time that should lapse between the time that the vehicle 17 starts its intended route and the time that the vehicle 17 reaches the associated location along the route).

The vehicle manager 29 is configured to monitor the amount of time that lapses as the vehicle 17 travels along the vehicle's route. For example, the computer system 31a can include a clock 38a that indicates the time of day. In this situation, the vehicle manager 29 is configured to store the time value of the clock 38a when the vehicle 17 begins the route. Therefore, the vehicle manager 29 can determine the amount of time that has lapsed since the start of the route by comparing the current time value of the clock 38a versus the stored time value for the start of the route. Alternatively, the clock 38a can be designed as a counter that begins timing or counting in response to a start signal transmitted by the vehicle manager 29. Therefore, the vehicle manager 29 transmits the start signal when the vehicle 17 starts the route, and thereafter, the vehicle manager 29 can determine the amount of time that has lapsed since the start of the route by analyzing the value of the clock 38a. Other devices and/or methodologies may be employed to determine the amount of time that has lapsed since the start of the route without departing from the principles of the present invention.

As the vehicle 17 travels along the predetermined route of travel, the vehicle manager 29 is configured to determine the vehicle's current position by analyzing the location values from the sensor 18. Furthermore, as the vehicle 17 travels, the vehicle 17 passes the points or locations along the route that are defined in the vehicle schedule 39a. The vehicle manager 29 is designed to compare the current location values of the vehicle 17 (i.e., of the sensor 18) with the location values defined by the vehicle schedule 39a in order to determine which entry in the vehicle schedule 39a corresponds with the current location of the vehicle 17. In the preferred embodiment, the entry that corresponds with the current location of the vehicle 17 is the entry having location values most closely matching the location values currently supplied by the sensor 18. In other words, the corresponding entry includes location values representing the location that is closest to the location of the vehicle 17. This entry will be referred to hereinafter as the "corresponding entry."

After determining which entry corresponds with the current location of the vehicle 17, the vehicle manager 29 is designed to determine whether the vehicle 17 is off schedule or on schedule. The vehicle 17 is off schedule if the amount of time that has lapsed since the start of the route differs from an estimated lapsed time by a predetermined amount of time. In the preferred embodiment, the estimated lapsed time is represented by the time value in the corresponding entry of the vehicle schedule 39a. As an example, assume for illustrative purposes only that the predetermined amount of time is five minutes. If the vehicle manager 29 determines that the difference between the actual lapsed time since the start of the trip and the estimated lapsed time (i.e., the time value in the corresponding entry) is greater than five minutes, then the vehicle 17 is off schedule. Otherwise the vehicle 17 is on schedule.

Furthermore, if the vehicle 17 is off schedule, then the vehicle manager 29 is also designed to determine whether the vehicle 17 is early or late. If the actual time lapsed since the start of the trip is greater than the estimated lapsed time, then the vehicle 17 is late. If the actual time lapsed since the start of the trip is less than the estimated lapsed time, then the vehicle 17 is early.

Alternatively, the vehicle manager 29 can be configured to select the corresponding entry in the predefined schedule 39a via comparison of time values instead of location values. In this regard, the vehicle manager 29 can be configured to compare the current time value indicated by the clock 38a (e.g., the lapsed time since the start of the route) with the time values in the entries of the vehicle schedule 39a. The corresponding entry is then the entry in vehicle schedule 39a having the estimated time value that differs the least with the actual time value indicated by clock 38a.

In this situation, the vehicle manager 29 compares the current location values from sensor 18 with the location values associated with the corresponding entry of the vehicle schedule 39a in order to determine whether or not the vehicle 17 is on schedule. If the location values differ by more than a predefined threshold value, then the vehicle 17 is off schedule. Otherwise, the vehicle is on schedule. Furthermore, if the actual location of the vehicle 17 (as defined by the current location values from sensor 18) is further along the route of travel than the location associated with the corresponding entry (as defined by the location values in the corresponding entry), then the vehicle 17 is early. If the location associated with the corresponding entry (as defined by the location values in the corresponding entry) is further along the route of travel than the actual location of the vehicle 17 (as defined by the current location values from sensor 18), then the vehicle 17 is late.

In response to a determination by the vehicle manager 29 that the vehicle 17 is off schedule, the vehicle manager 29 is designed to transmit a status message to Base Station Control Unit (BSCU) 40 (FIG. 1), which is remotely located from the vehicle 17. The status message preferably indicates that vehicle 17 is off schedule and indicates the amount that vehicle 17 is off schedule. Co-pending U.S. patent application entitled "System and Method for Enciphering and Communicating Vehicle Tracking Information" filed by Jones, et al. on Sep. 30, 1998, and assigned Ser. No. 09/163,606, which is incorporated herein by reference, describes a system and method for transmitting messages to BSCU 40.

Transmission of a Status Message

Figure 4:
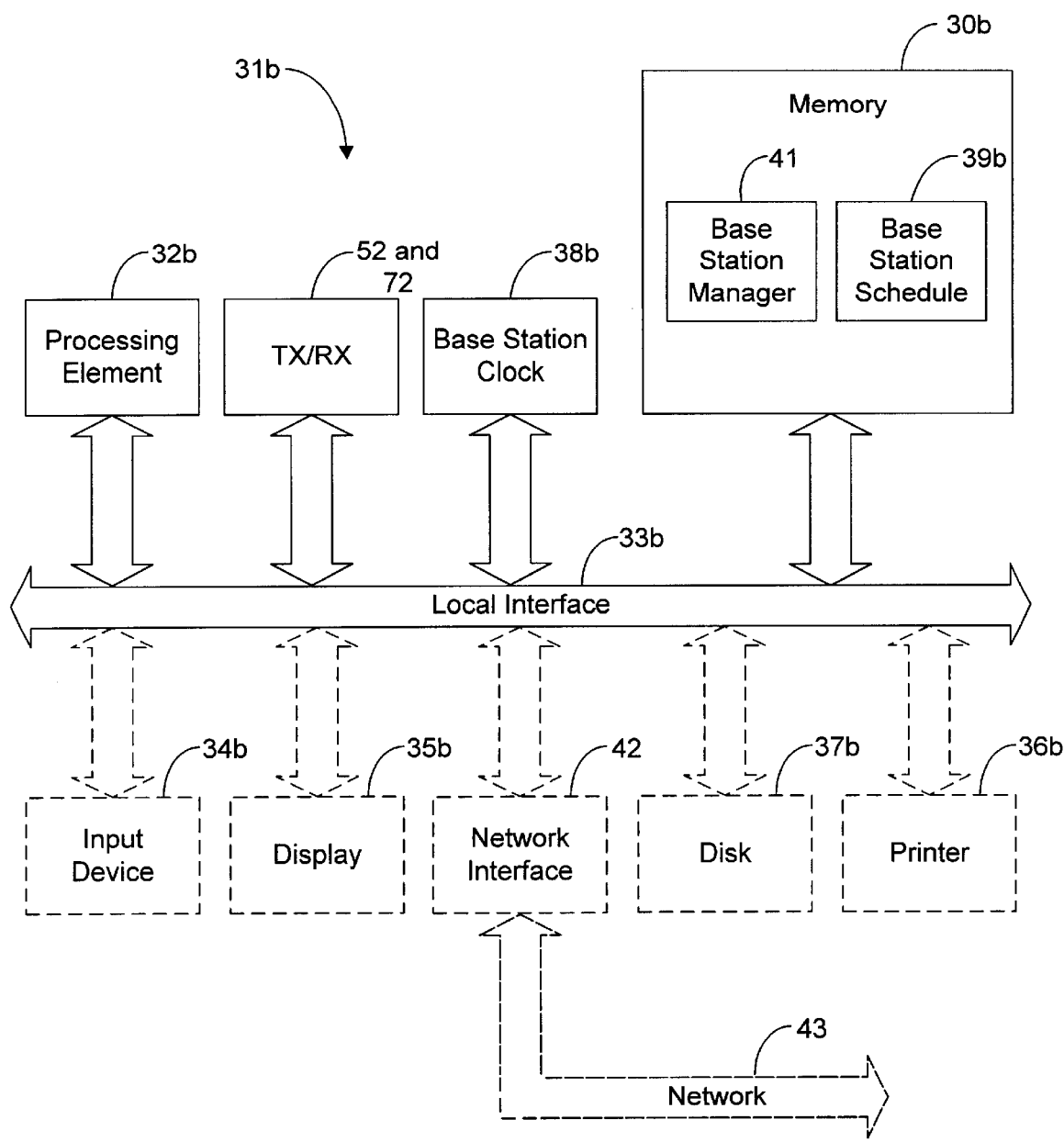
FIG. 4 is a block diagram illustrating a computer implementing the functionality of the base station manager of FIG. 1 in accordance with the preferred embodiment of the present invention.

BSCU 40 preferably includes a base station manager 41 designed to monitor the travel of each vehicle 17 associated with the system 10. The base station manager 41 can be implemented in software, hardware, or a combination thereof. In the preferred embodiment, as illustrated by way of example in FIG. 4, the base station manager 41 of the present invention along with its associated methodology is implemented in software and stored in computer memory 30b of a computer system 31b. The computer system 31b can be similar to computer system 31a, as can be seen by comparing FIG. 3 to FIG. 4. In this regard, the computer system 31b may include memory 30b for storing the base station manager 41, and the computer system 31b may also include processing element 32b, local interface 33b, input 34b, display 35b, printer 36b, and storage disk 37b. It may also be desirable for computer system 31b to include a network interface 42 that allows the system 31b to exchange data with a network 43. It should be noted that input device 34b, display 35b, printer 36b, disk 37b, network interface 42, and network 43 are optional.

In order to transmit the status message to the BSCU 40, the vehicle manager 29 is configured to transmit the status message, via signal 43 (FIG. 2), to a communications device 44, which is capable of transmitting and receiving data to and from devices outside of vehicle 17. In this regard, communications device 44 is preferably a cellular modem configured to transmit and receive wireless signals to and from a cellular network 48 (FIG. 1).

The communications device 44 can transmit the status message over the voice channels associated with the cellular network 48, as is done by most cellular modems of the prior art. However, in order to reduce the cost associated with transmitting the travel data through the cellular network 48, the status message may be communicated through the cellular network 48 via a data or control channel. In this regard, the status message can be encoded by altering identifiers of the communications device 44, such as the mobile identification number (MIN) or electronic serial number (ESN), transmitted over a data channel of the cellular network 48. Alternatively, the status message can be appended to a feature request transmitted over the data channel. U.S. Pat. No. 5,771,445 entitled "Data Messaging in a Communications Network using a Feature Request," filed on Dec. 15, 1995, by Kennedy, III, et al., and U.S. Pat. No. 5,546,444 entitled "Methods and Apparatus for Communicating Data Via a Cellular Network Control Channel" filed on Mar. 11, 1994, by Roach, Jr., et al., which are both incorporated herein by reference, discuss the transmission of travel data over a data or control channel associated with the cellular network 48 in further detail.

In order to transmit the status message through a data channel by manipulating identifiers of the communications device 44, the MIN of the communications device 44 is altered to include the status message, but the ESN remains fixed to be used as an identifier of the communications device 44. Therefore, after transmitting the identifiers through the data channel, the communications device 44 can be identified by the ESN, and the status message can be determined from the MIN. Alternatively, the ESN of communications device 44 can be altered while the MIN is kept constant. It should be understood that the invention contemplates modification of the MIN, ESN, both the MIN and ESN, or other identifiers of the communications device 44 to accomplish the dual task of transmitting status messages and identifying the communications device 44.

Alternatively or in combination with the manipulation of the identifiers of the communications device 44, the status message can be communicated through the data channel by appending the status message to feature requests that are transmitted through the data channel. In this regard, most feature requests are generated by automatically or manually dialing the star key ("*") followed by a two-digit feature request identification code, and 29 digits of data. Therefore, for each feature request generated, 29 digits of data pertaining to the status message can be appended to the two-digit feature request identification code and sent over the data channel of the cellular network 48. Other embodiments may transmit different amounts of data following the feature request. By utilizing the manipulation of identifiers or the appendage of travel data to feature requests, less data is transmitted through the voice channels of the cellular network 48, thereby reducing the cost of transmitting data through the cellular network 48.

In order for successful communication to exist between vehicle manager 29 and base station manager 41, both managers 29 and 41 should be aware of the communication protocol utilized. Therefore, it is desirable for the base station manager 41 or the vehicle manager 29 to initially transmit an instruction via the data channel of the cellular network 48 to the other manager 29 or 41 indicating the protocol to be utilized. Thereafter, the vehicle manager 29 transmits messages to the base station manager 41 via the selected protocol.

Cellular network 48 is designed to transmit the status message to a communications device 52 (FIG. 1) at the BSCU 40. Although not necessary for implementation of the present invention, cellular network 48 is preferably designed to transmit to the communications device 52 via a public switched telephone network (PSTN) 55. In this regard, PSTN 55 establishes a link between communications device 52 and cellular network 48, whereby cellular network 48 and communications device 52 can communicate via signals 61 and 65. Therefore, communications device 52 is preferably designed as a PSTN modem capable of communicating signals 65 between base station manager 41 and PSTN network 55.

Although the preferred embodiment utilizes a cellular network 48 and a PSTN network 55 to communicate travel data to base station manager 41, one ordinarily skilled in the art should realize that other configurations are possible. For example, communications device 52 can be configured as a cellular modem capable of communicating signals directly with cellular network 48. Alternatively, utilization of communication networks 48 and 55 can be completely circumvented by configuring the communications device 44 to communicate directly with communications device 52, for example. Any embodiment capable of communicating data between vehicle manager 29 and base station manager 41 should be suitable for implementing the principles of the present invention.

It should be noted that by transmitting a status message only when the vehicle 17 is off schedule reduces the cost of operating the system 10. In this regard, communication through a cellular network 48 is relatively expensive, and the cost is based on the amount of data transmitted. By refraining from transmitting any data from the vehicle manager 29 to the base station manager 41 when the vehicle 17 is on schedule, the amount of data transmitted through the cellular network 48 is reduced, thereby reducing the communication cost associated with the system 10. Therefore, the present invention's methodology of assuming the vehicle 17 is on schedule and of only transmitting data to the base station manager 41 when the vehicle 17 is off schedule enables the system 10 to minimize costs.

Base Station Manager

Base station manager 41 is designed to monitor the travel of the vehicle 17 and (when employed in the context of advance notification system 12) is also designed to transmit a notification message to a user when the vehicle 17 is a predetermined proximity from a particular vehicle destination or other location. The predetermined proximity can be a particular time or distance that the vehicle 17 is from the destination. If the vehicle 17 is off schedule, then the base station manager 41 is further configured to transmit a message to the user indicating that the vehicle 17 is off schedule.

The base station manager 41 of tracking system 10 is designed to determine the current location of the vehicle 17 and to compare the current location of the vehicle 17 to a predefined location along the route of travel of the vehicle 17 in order to determine whether notification should be sent to the user. In this regard, like the vehicle manager 29, the base station manager 41 includes a predefined schedule 39b, referred herein as the "base station schedule 39b," in memory 30b. Furthermore, similar to the computer system 31a (FIG. 3), the computer system 31b (FIG. 4) includes a clock 39b or other type of counter that can be used to determine the amount of time that has lapsed since the vehicle 17 started traveling along the vehicle's route. When the vehicle 17 begins the route, the vehicle manager 29 preferably transmits a message to the base station manager 41 via communication devices 44 and 52 indicating that travel on the route is beginning. In response, the base station manager 41, like the vehicle manager 29, begins monitoring the amount of time lapsed since the start of the route.

In the preferred embodiment, the base station schedule 39b stored in memory 30b matches the vehicle schedule 39a stored in memory 30a, although variations in the two predefined schedules 39a and 39b are possible. Furthermore, the base station manager 41 is configured to retrieve an entry, the "corresponding entry," in the base station schedule 39b corresponding with the amount of time lapsed since the vehicle 17 began travelling its route. In this regard, the base station manager 41 compares the amount of time that has lapsed since the vehicle 17 began its route (as determined from the clock 38b at the BSCU 40) with the time values in the base station schedule 39b. The corresponding entry in the base station schedule 39b is the entry having the time value differing the least with the value indicated by the clock 38b (i.e., the time value indicating the amount of time that has lapsed since the vehicle 17 began its route).

The base station manager 41 assumes that the vehicle 17 is on schedule, unless the base station manager 41 has received a recent status message from the vehicle manager 29. As used herein, a "recent status message" is the most recent status message that has been received by the base station manager 41 within a predetermined time. For example, a recent status message could be the latest status message received within the last five minutes or some other suitable time frame. Therefore, if the base station manager 41 has not received a recent status message from the vehicle manager 29, then the base station manager 41 assumes that the location values in the corresponding entry of the predefined base station schedule 39b indicate the current location of the vehicle 17.

Recalling that base station manager 41 (when employed within the context of notification system 12) is to transmit a notification message when the vehicle 17 is a predetermined proximity from a particular location (e.g., a vehicle stop), the base station manager 41 then compares the location values in the corresponding entry (which represents the current location of the vehicle 17) with location values defining the predetermined proximity. If the location values from the corresponding entry differ from the location values of the predetermined proximity by less than a predetermined amount, then the base station manager 41 transmits a notification message to the user. Otherwise no notification message is transmitted to the user.

Alternatively, the base station manager 41 can be configured to compare time values instead of location values in order to determine whether a notification message should be transmitted to the user. In this regard, the base station manager 41 is designed to compare the time value in the corresponding entry with a predetermined threshold value indicating the amount of time that should lapse between the vehicle 17 starting its route and arriving at a location associated with the predetermined proximity (e.g., a threshold value indicating how long the vehicle should travel along its route before notification should be sent to the user). If the threshold value in the corresponding entry exceeds the predetermined time value, then the base station 41 transmits a notification message to the user.

If the base station manager 41 of tracking system 10 has received a recent status message from the vehicle manager 29, then the base station manager 41 determines the actual location values of the vehicle 17 based on the location values in the corresponding entry and the recent status message. In this regard, the location values in the corresponding entry represent the estimated location of the vehicle 17. The status message indicates how much the vehicle 17 is off schedule (i.e., how far the vehicle 17 is from the estimated location). For example, the status message can indicate that the vehicle is five miles off schedule. Therefore, the base station manager 41 is designed to calculate new location values based on the estimated location and the status message. These new location values represent the actual location of the vehicle 17. Therefore, by substituting the new location values for the values in the corresponding entry, the base station manager 41 can determine whether a notification message should be sent to the user according to the methodology described hereinabove.

Furthermore, instead of indicating how far the vehicle is from the estimated location via location values, the status message can indicate how far the vehicle 17 is from the estimated location via a time value (e.g., the status message can indicate that the vehicle 17 is ten minutes late). In this case, the base station manager 41 is designed to adjust the time value in the corresponding entry to account for the vehicle 17 being off schedule. For example, if the vehicle 17 is early, then the time value in the corresponding entry is increased a corresponding amount, and if the vehicle 17 is late, then the time value in the corresponding entry is decreased a corresponding amount. This adjusted time value is then compared with the predetermined threshold value described hereinabove in order to determine whether notification should be sent. If the adjusted time exceeds the predetermined time value, then the base station 41 transmits a notification message to the user.

In an alternative embodiment, the location values transmitted in the status message can represent the actual location of the vehicle 17 instead of representing how far the vehicle 17 is off schedule. In this embodiment, the base station manager 41 can be designed to directly compare these location values with the location values defining the predetermined proximity in order to determine whether notification should be sent to the user. Accordingly, if these location values differ from the location values defining the predetermined proximity by less than a predetermined amount, then the base station manager 41 transmits a notification message to the user. Otherwise, no notification message is sent to the user.

Transmission of a Notification Message

Once the base station manager 41 of systems 10 and 12 determines that a notification message should be sent to a user, the base station manager 41 is designed to communicate a message to the user via PSTN network 55 and communications devices 72 and 73 (FIG. 1). In this regard, communications devices 72 and 73 are preferably PSTN modems capable of interfacing with and communicating with PSTN network 55. Base station manager 41 is designed to transmit the message as signal 70 to user communications device 72, which communicates the message with PTSN network 55 via signal 74. PTSN network 55 then communicates the message to communications device 73, which is preferably configured to communicate the message to a message device 75. Message device 75 is configured to notify the user of the impending arrival of the vehicle 17 at one of the vehicle stops. Preferably, message device 75 is a computer capable of displaying the notification through e-mail or some other communications software. Alternatively, message device 75 can be a telephone, a pager or any other device capable of notifying the user. Furthermore, a plurality of communications devices 72 preferably exist so that the base station manager 41 can simultaneously notify a plurality of users or parties of the impending arrival of the vehicle 17 at the vehicle stop.

Although the preferred embodiment utilizes a PSTN network 55 to communicate a notification message to message device 75, one ordinarily skilled in the art should realize that other configurations are possible. For example, other communication networks can be utilized or utilization of communication networks can be completely circumvented by configuring communications device 72 to communicate directly with communications device 73. Any embodiment capable of communicating data between base station manager 41 and message device 75 should be suitable for implementing the principles of the present invention.

Creation of the Vehicle and Base Station Schedules

It should be noted that the predefined vehicle schedule 39a and the predefined base station schedule 39b can be determined or defined by a variety of methodologies. For example, the predetermined schedules 39a and 39b can be estimated based on various factors, such as the types of speeds likely to be traveled by the vehicle 17 and the types of traffic conditions expected to be encountered during travel. However, in the preferred embodiment, the predefined schedules 39a and 39b are defined via a previous delivery of the vehicle 17 along the same route of travel.

In this regard, delivery vehicles 17 frequently travel the same routes. This is especially true for buses, for example, where a bus routinely travels the same route and makes the same stops. As the vehicle 17 is traveling the route, the vehicle manager 29 is configured to periodically read the sensor 18 and to store an entry in memory 30a. The entry preferably includes the current location values of the vehicle 17 indicated by sensor 18 and the time value indicated by clock 38a (i.e., the time value indicating the amount of time that has lapsed since the start of the travel on the route). Therefore, when the vehicle 17 reaches the end of the route, the vehicle manager 29 has stored numerous entries which define the predefined vehicle schedule 39a. This predefined schedule 39a may also be used as the base station schedule 39b. Other methodologies may be employed to define the vehicle schedule 39a and/or the base station schedule 39b.

Figure 5:
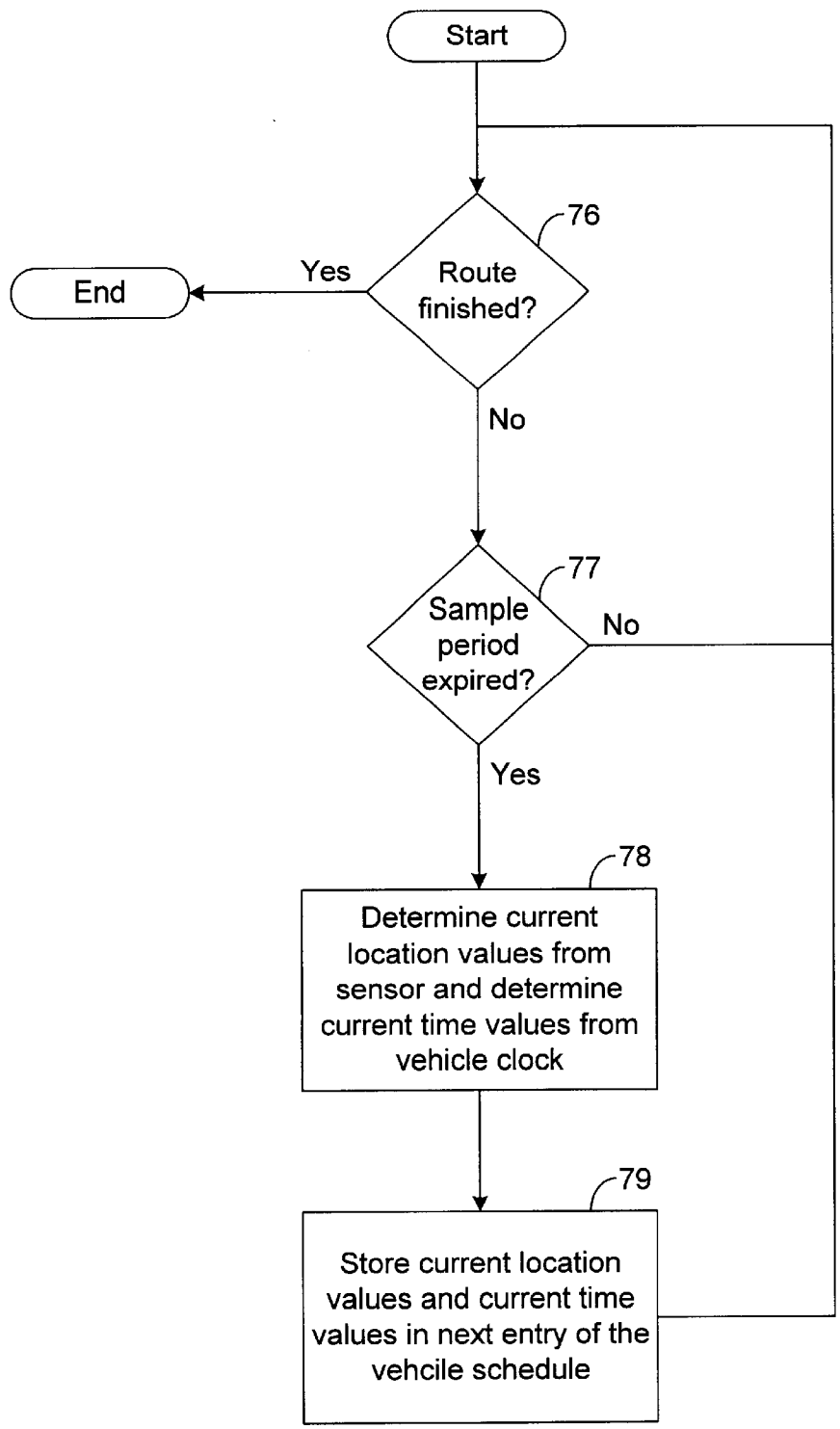
FIG. 5 is a flow chart illustrating the architecture, functionality, and operation of the vehicle control unit of FIG. 2 while the vehicle control unit is creating the vehicle schedule of FIG. 3.

FIG. 5 is a flow chart depicting the operation and functionality of the vehicle manager 29 in embodiments where the vehicle manager 29 determines the vehicle schedule 39a while traveling along the route of travel. As shown by blocks 76 and 77, the vehicle manager 29 determines whether a sample period has expired while the vehicle is traveling on the route (i.e., before the vehicle 17 has finished the route). The sample period is a predetermined amount of time that lapses between samples, which will be discussed in more detail hereinbelow. Preferably, the vehicle clock 38a indicates whether the sample period has expired. For example, when the clock 38a is a counter, the sample period can be defined as a predetermined number of counts by the clock 38a. Therefore, the vehicle manger 29 can determine whether the sample period has expired by counting the number of increments or cycles of the clock 38a.

When the vehicle manager 29 determines that the sample period has expired, the vehicle manager 29 samples the current location values of the vehicle 17 and the time value of the clock 38a. In other words, the vehicle manager 29 determines the current location values of the vehicle 17 and the current time value from the clock 38a and stores these values in the next entry of the vehicle schedule 39a, as depicted by blocks 78 and 79. This process repeats until the vehicle manager 29 determines that the vehicle 17 has completed the route. Thereafter, the vehicle manager 29 can use the vehicle schedule 39a to track the vehicle's progress on future deliveries that utilize the route defined by the vehicle schedule 39a.

Alarm System

Preferably, the vehicle manager 29 is further configured to compare the corresponding entry and the location values supplied from the sensor 18 in order to determine whether an alarm signal should be generated. In this regard, the vehicle manager 29 preferably subtracts the location values in the corresponding entry from the current location values of the vehicle 17 (as determined by the sensor 18) to produce a deviation indicator. Therefore, the deviation indicator indicates how far the vehicle 17 has deviated from the route defined by the vehicle schedule 39a.

The vehicle manager 29 is then designed to compare the deviation indicator to an alarm threshold value to determine whether an alarm signal should be transmitted to the base station manager 41. The alarm threshold value corresponds with the distance that the vehicle 17 can deviate from the predefined vehicle schedule 39a before an alarm is generated. Therefore, if the deviation indicator exceeds the alarm threshold value, the vehicle manager 29 transmits an alarm message to the base station manager 41 via communications devices 44 and 52. Preferably the alarm message includes the current location values produced by the sensor 18 so that the travel of the vehicle 17 can be tracked by the base station manager 41.

Providing an alarm message, as described hereinabove, helps to discover when a vehicle 17 has been stolen or hijacked and helps law enforcement agencies to recover the vehicle 17 by tracking the travel of the vehicle 17 once the vehicle 17 has been stolen. In this regard, the vehicle manager 29 automatically generates an alarm message and monitors travel of the vehicle 17 once the vehicle 17 deviates from the vehicle schedule 39a by a predetermined amount. The alarm message can be used by law enforcement agencies to discover when the vehicle 17 has been stolen and where the vehicle 17 is located, thereby helping law enforcement agencies to recover the vehicle 17 once it has been stolen.

Because the deviation indicator is defined relative to points along the vehicle's route of travel, an alarm can be generated when the vehicle 17 deviates from the route by a relatively small amount. For example, the vehicle manager 29 can be configured to transmit an alarm signal when the vehicle 17 deviates from its predefined route by approximately 20 feet. Other distances, both less than and greater than 20 feet, may be used to trigger an alarm signal. However, it is generally desirable that a certain amount of deviation (depending on the expected driving conditions and the precision of sensor 18) be allowed so that the vehicle 17 can reasonably maneuver through traffic without generating false alarms.

In addition, the alarm threshold value is selectable in the preferred embodiment. This value can be entered into the computer system 31a by a human operator at the vehicle 17 via input device 34a, for example. Alternatively, this value can be communicated from the base station manager 41 to the vehicle manager 29 via communications devices 44 and 52 at or around the start of the route. The alarm threshold value can also be hardwired into the computer system 31a with switches that can be manipulated by a human operator in order to selectively change the value. Many other methodologies known in the art may be used for selecting the value of the alarm threshold value.

It should be noted that in other embodiments, it may be desirable for the vehicle manager 29 to generate an alarm signal based on comparisons of the location of vehicle 17 to a predefined geographical region instead of the route defined in vehicle schedule 39a. For example, it may desirable to define a region that is 30 miles (or some other distance) from the start of the route (or some other particular location). Then, the vehicle manager 29 can be configured to generate an alarm signal if the vehicle manager 29 determines that the vehicle 17 is outside of this predefined region based on the signals 27 received from sensor 18. Such a methodology for generating an alarm signal is particularly suitable for applications where only local deliveries are expected, for example.

There are various methodologies for determining whether the vehicle 17 is outside of the predefined region. For example, in one embodiment, the vehicle manger 29 subtracts the current location values determined from signals 27 with the location values of a particular point (e.g., the location values of the start of the route, when the region is defined as any point within a certain distance of the start of the route) to derive the deviation indicator. As in the preferred embodiment, if the deviation indicator has a magnitude greater than the alarm threshold value, the vehicle manager 29 generates an alarm signal. Otherwise, no alarm signal is generated.

Second Embodiment of the VCU

In a second embodiment of the present invention, the "corresponding entry" of the vehicle schedule 39a is defined as the entry having location values defining a location along the route that was most recently passed by the vehicle 17. Therefore, the vehicle manager 29 monitors the signals 27 from the sensor 18 until the vehicle manager 29 determines that the vehicle passed a location corresponding with one of the entries in the vehicle schedule 39a. The vehicle manager 29 determines whether the vehicle 17 is early or late via the techniques described hereinabove using the aforementioned entry as the corresponding entry.

After determining whether to generate an alarm signal and/or status message for the corresponding entry (and after generating the alarm signal and/or the status message, if necessary), the vehicle manager 29 monitors the signals 27 again for the next corresponding entry. Therefore, when a corresponding entry is detected (i.e., when the vehicle manager 29 determines that the vehicle 17 passed a location corresponding with the location values in one of the entries of the vehicle schedule 39a for the first time), the vehicle manager 29 analyzes the values of the sensor 18, the clock 38a, and the corresponding entry to determine whether an alarm signal and/or status message should be generated. Thereafter, the vehicle manager 29 waits until the next corresponding entry is detected before determining whether to generate another status message. Therefore, the vehicle manager 29 determines whether a status message should be communicated to the base station manager 41 each time the vehicle 17 passes a location corresponding with the location values in one of the entries of the vehicle schedule 39a, and the vehicle manager 29 refrains from communicating status messages as the vehicle 17 travels between locations defined by the data in the vehicle schedule 39a. In other words, the only time the vehicle manager 28 transmits a status message is when the vehicle 17 is passing a location corresponding with one of the entries in the vehicle schedule 39a or a short time thereafter.

However, since it is possible for the vehicle 17 not to pass any of the locations defined in the predefined schedule when the vehicle deviates from the route (e.g., when the vehicle 17 is stolen), the vehicle manager 29 preferably determines whether to communicate an alarm signal periodically rather than waiting for one of the locations defined by the vehicle manager 29 to be passed.

Operation

The preferred use and operation of the system 10 and associated methodology are described hereafter. For illustrative purposes only, assume that the vehicle 17 is to travel a predetermined route to a destination where the vehicle 17 is to pick up or deliver an item. For example, assume that the vehicle 17 is a bus that is to travel to a bus stop to pick up a passenger and that this passenger is to receive a notification signal when the vehicle 17 is ten minutes from the bus stop.

Initially, the vehicle schedule 39a is stored in the vehicle manager 29 and the base station schedule 39a is stored in the base station manager 41. In the preferred embodiment, the vehicle schedule 39a was created and stored in the vehicle manager 29 as the vehicle 17 previously traveled along the same route. A copy of the vehicle schedule 39a is preferably transferred to the base station manager 41 via any suitable methodology and stored as the base station schedule 39a. For example, the vehicle schedule 39a can be copied to a magnetic disk and later downloaded in memory 30b or a copy of the vehicle schedule 39a can be transmitted to the base station manager 41 via communications devices 44 and 52.

In embodiments where the vehicle schedule 39a is not previously created and stored by the vehicle manager 29, the vehicle schedule 39a is preferably downloaded into both the base station manager 41 and the vehicle manager 29. It is possible to download the base station schedule 39a in the base station manager 41 and to transmit a copy of the base station schedule 39a to the vehicle manager 29 via communications devices 44 and 52 prior to the start of the route. Any methodology for respectively storing the vehicle schedule 39a and the base station schedule 39b into the vehicle manager 29 and the base station manager 41 is suitable for the purposes of the present invention.

When the vehicle 17 begins travel, the vehicle manager 29 stores the current value of the vehicle clock 38a and begins to monitor the amount of time that lapses from that point until completion of the route. Furthermore, as can be seen by block 82 of FIG. 6, the vehicle manager 29 also transmits a start signal to the base station manger 41 via communications devices 44 and 52 indicating that travel of the vehicle 17 is beginning. In response, the base station manager 41 begins to monitor the lapsed time as well.

In many situations, it may be desirable to begin monitoring travel of the vehicle 17 after the vehicle 17 starts its route. This is particularly true when unpredictable delays usually occur close to the staring point of the route. For example, when the vehicle 17 is a school bus taking children home from school, unpredictable delays may occur close to the starting point (i.e., at the school) where traffic is often congested. Therefore, instead of transmitting a start signal to the base station manager 41 when the vehicle 17 begins traveling, the vehicle manager 29 waits for a predetermined time period or until the vehicle 17 has traveled a predetermined distance from the starting point before transmitting the start signal. For example, the vehicle manager 29 can monitor the travel of the vehicle 17 from the starting point via the sensor 18 and transmit the start signal once the vehicle manager 29 determines that the vehicle has traveled one-eighth of a mile from the starting point. In this regard, location values representing a predetermined point along the route of travel and one-eighth of a mile from the starting point can be stored in the vehicle manager 29. When the vehicle manager 29 determines that the vehicle 17 passes this point, the vehicle manager 29 determines that the vehicle 29 has traveled more than one-eighth of a mile and transmits the start signal.

Preferably, the predetermined schedules 39a and 39b both use the point where the vehicle manager 29 transmits the start signal as the starting point for the route. Therefore, the distances and times stored in the predetermined schedules 39a and 39b are relative to the predetermined location where vehicle manager 29 transmits the start signal instead of the actual starting point of the route. However, this is not a necessary feature of the present invention, and the location values and time values stored in the predetermined schedules 39a and 39b may be relative to other points both along the route of travel and outside of the route of travel.

Figure 6:
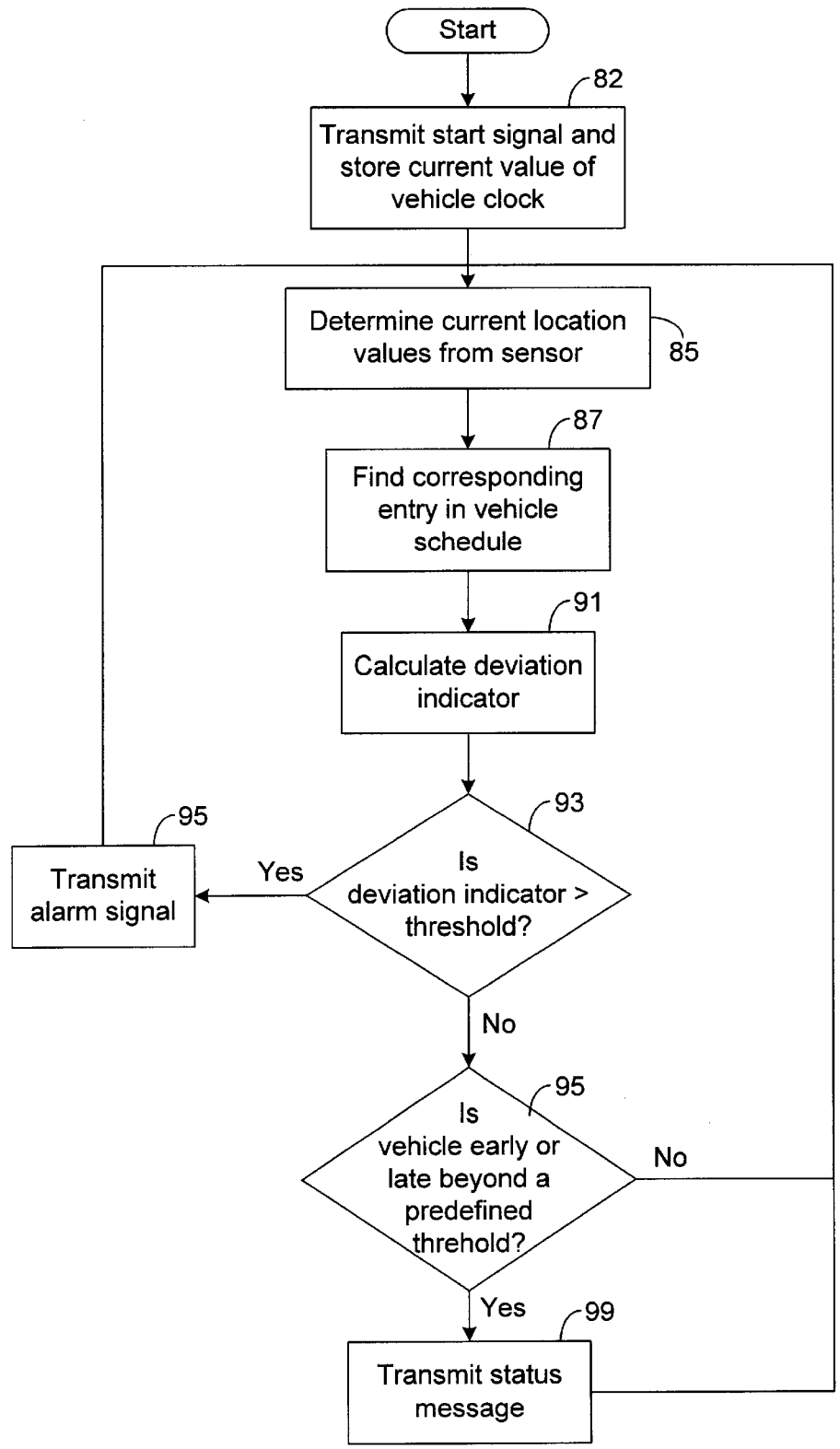
FIG. 6 is a flow chart illustrating the architecture, functionality, and operation of the vehicle control unit of FIG. 2 while the vehicle control unit is tracking the vehicle of FIG. 1.

As the vehicle 17 travels, GPS satellites 23 transmit wireless signals 21a–21c to sensor 18 that can be analyzed through techniques well known in the art to determine a position (i.e., current location values) of the sensor 18 (and, therefore, of the vehicle 17) relative to a particular reference point, as depicted by block 85 of FIG. 6. For example, in GPS systems, the intersection of the Equator and the Prime Meridian is typically used as the reference point. Sensor 18 receives the signals 21a–21c and determines location values representing the position of the vehicle 17 relative to the reference point and transmits these values to vehicle manager 29.

The vehicle manager 29 compares the current location values of the vehicle 17 with the location values in the vehicle schedule 39a in order to determine which entry in the vehicle schedule 39a corresponds with the current location of the vehicle 17, as shown by block 87 of FIG. 6. The corresponding entry is preferably the entry having location values that most closely match the current location values received from the sensor 18.

After selecting the corresponding entry, the vehicle manager 29 retrieves the location values associated with the corresponding entry and subtracts these values from the current location values received from the sensor 18 and used by the vehicle manager 29 to select the corresponding entry. Referring to block 91 of FIG. 6, the resulting value or values (referred to as the deviation indicator) indicates the vehicle's deviation from the vehicle schedule 39a. As shown by block 93 of FIG. 6, the vehicle manager 29 then compares the deviation indicator to the alarm threshold value. If the deviation indicator exceeds the alarm threshold value, then the vehicle manager 29 transmits an alarm message to the base station manager 41, as depicted by block 95 of FIG. 6. The alarm message includes the current location of the vehicle 18, and the base station manager 41 tracks the location of the vehicle 17 based on the alarm messages transmitted from the vehicle manager 29. The information provided by the alarm message can be used by law enforcement agencies to track the vehicle 18.

After determining whether an alarm message should be generated, the vehicle manager 29 retrieves the time value associated with the corresponding entry and compares it with the time value indicated by clock 38a (i e., the time value indicating the amount of time elapsed since the start of the route). The vehicle manager 29 also retrieves a predetermined threshold value indicating how much the vehicle 17 can deviate from the vehicle predefined schedule 39a before the vehicle 17 is considered to be off schedule. Referring to block 97 of FIG. 6, if the difference of the foregoing time values exceeds the predetermined threshold value, then the vehicle manager 29 determines that the vehicle 17 is off schedule. However, if the difference of the foregoing time values is less than the predetermined threshold value, then the vehicle manager 29 determines that the vehicle 17 is on schedule.

When the vehicle manager 29 determines that the vehicle 17 is on schedule, the vehicle manager takes no further action regarding the current location values received from the sensor 18. The vehicle manager 29 merely receives a new set of location values from the sensor 18 and analyzes the new set of values according to the methodology described herein. However, when the vehicle manager 29 determines that the vehicle 17 is off schedule, the vehicle manager 29 generates a status message and transmits the status message to the base station manager 41, as depicted by block 99 of FIG. 6.

In this regard, the vehicle manager 29 determines whether the vehicle 17 is early or late and how far the vehicle 17 is off schedule (e.g., how many minutes or miles the vehicle 17 is from the location specified by the location values in the corresponding entry). The vehicle manager 29 then generates a status message including this information and transmits the status message to the base station manager 41 via communications devices 44 and 52.

In order to reduce the number of transmissions between the vehicle 17 and the base station control unit 40, the vehicle manager 29 preferably transmits the status message to the base station manager 41 only if another status message has not been transmitted within a predetermined delay period. For example, if a status message has been sent within the last five minutes, then the vehicle manager 29 refrains from sending another status message. It should be apparent to one skilled in the art that other delay periods can be selected to update the location of the vehicle 17 at a desirable rate.

Furthermore, it is possible to selectively control the delay period. For example, when the vehicle 17 stops to make a delivery or is slowly traveling through congested areas, it may be desirable to increase the delay period to decrease the number of status messages sent to the base station manager 41. Alternatively, when the vehicle 17 is traveling quickly and the location of the vehicle 17 is changing rapidly, it may be desirable to decrease the delay period. Furthermore, when the vehicle 17 enters an area where no immediate deliveries or pick ups are to made, there is no immediate need to monitor the vehicle 17 and the delay period can be increased. The delay periods can be predefined in memory 30a, can be controlled by the operator of the vehicle 17, or can be controlled via signals transmitted from remote locations to the vehicle manager 29 (e.g., from the base station manager 41 to the vehicle manager 29 via communications device 44). Other methodologies for controlling the delay periods are possible.

Another way to reduce the number of transmissions of status messages at desired times is to selectively increase the predefined amount that the vehicle 17 should be off schedule before a status message is transmitted to the base station control manager 41. Similar to the changes in the delay periods described above, the changes to the aforementioned predefined amount can be predefined in memory 30a, can be controlled by the operator of the vehicle 17, or can be controlled via signals transmitted from remote locations to the vehicle manager 29 (e.g., from base station manager 41 to vehicle manager 29 via communications device 44).

The input device 34a (FIG. 3) can be used to input changes in the delay period and/or in the predefined amount that the vehicle should be off schedule before a status message is transmitted. In this regard, the input device 34a may include switches, buttons, a key pad, or any other device that can be manipulated by the operator of the vehicle 17 to input the changes.

When the base station manager 41 receives a status message, the base station manager 41 stores the status message in memory 30b. If desired, the base station manager 41 transmits a message to the user via communications devices 72 and 73 indicating that the vehicle 17 is off schedule and indicating how much the vehicle 17 is off schedule in response to the status message.

The base station manager 41 periodically determines whether a notification message should be sent to the user indicating that arrival of the vehicle 17 at the bus stop is imminent (e.g., indicating that the vehicle 17 is ten minutes from the bus stop). In this regard, the notification message should be sent to the user when the vehicle 17 is within a predetermined proximity (i.e., a predetermined time or distance) from the bus stop. To determine whether the notification message should be sent, the base station manager 41 compares the location values of the current location of the vehicle 17 to the location values of the predetermined location (e.g., the bus stop). If the difference between the location values of the current location of the vehicle 17 and the bus stop is greater than a threshold value, then the vehicle 17 is too far from the bus stop for notification to be sent to the user. Therefore, a notification message is not generated. However, if the difference between the location values of the current location of the vehicle 17 and the bus stop is less than the threshold value, then a notification message is transmitted to the user via communications devices 72 and 73, unless a similar notification message (i.e., a message indicating that the vehicle 17 is off schedule by the same amount) associated with the bus stop has previously been sent to the user.

In determining the current location of the vehicle 17, the base station manager 41 assumes that the vehicle 17 is on schedule unless a recent status message has been received. Therefore, the vehicle manager 41 determines which entry in the base station schedule 39b corresponds to the assumed location of the vehicle 17. In this regard, the vehicle manager 41 compares the time values in the base station schedule 39b with a lapsed time value indicating how much time has lapsed since the vehicle 17 started the route. The entry having a time value closest to this lapsed time value is the corresponding entry. The location values associated with the corresponding entry represent the assumed location of the vehicle 17. Unless a recent status message has been received, the base station manager 41 uses these location values as the current location values to be compared against the location values of the predetermined location (e.g., the bus stop) in order to determine whether a notification message should be sent to the user. However, if a recent status message has been received, then the base station manager 41 determines the current location values of the vehicle 17 based on the recent status message and/or the location values associated with the corresponding entry.

For example, if the recent status message includes location values indicating the actual location of the vehicle 17, then the base station manager 41 uses these values to compare with the coordinate values of the predetermined location (e.g., the bus stop). However, if the status message only indicates how much the vehicle 17 is off schedule, then the base station manager 41 calculates the current location values of the vehicle 17 based on the status message and the location values associated with the corresponding entry in the base station schedule 39b.

Once the current location values of the vehicle 17 have been determined, the base station manager 41 compares the current location values of the vehicle 17 with the location values of the predetermined location (e.g., the bus stop) as previously described hereinabove to determine whether a notification signal should be transmitted to the user.

The operation of the preferred embodiment of the present invention has been described hereinabove in the context where the vehicle manager 29 compares location values to determine the corresponding entry in the vehicle predefined schedule 39a. Therefore, the vehicle manager 29 compares the time value associated with the corresponding entry in the vehicle schedule 39a to determine whether or not the vehicle 17 is on schedule. However, it should be apparent to one skilled in the art upon reading this disclosure that time values may be compared by the vehicle manager 29 to determine the corresponding entry in the vehicle predefined schedule 39a.

In this regard, the entry in the vehicle schedule 39a having a time value most closely matching the lapsed time value indicated by the clock 38a (i.e., the value indicating the amount of time lapsed since the start of the route) can be selected as the corresponding entry. As a result, the vehicle manager 29 determines how far the vehicle 17 is off schedule based on distance rather than time. For example, if the difference between the current location values of the vehicle 17 (as determined by the sensor 18) and the location values associated with the corresponding entry is greater than a predetermined threshold value, then the vehicle 17 is off schedule. Otherwise, the vehicle 17 is on schedule. Furthermore, regardless of which embodiment is used to determine how far the vehicle 17 is off schedule, the vehicle manager 29 can indicate how far the vehicle 17 is off schedule via the status message using either distance values, time values, or any other type of values known in the art for indicating the position of the vehicle 17.

It should be noted that the preferred embodiment of the present invention has been described hereinabove assuming that the sensor 18 is capable of determining the vehicle's location based on signals received from satellites 23. However, this is not a necessary feature of the present invention, and any type of sensor 18 that may be used for determining the vehicle's position along the route of travel is sufficient for the purposes of the present invention. For example, the sensor 18 may be designed as an odometer that indicates how far the vehicle 17 travels. Therefore, the predetermined points along the route of travel used to determine whether the vehicle 17 is on or off schedule can be defined in the schedules 39a and 39b relative to their distance from the starting point of the route. In other words, the location values stored in the schedules 39a and 39b correspond to distance values indicating how far the predetermined points are from the starting point of the route. Therefore, the vehicle manager 29 can determine how far the vehicle 29 is from any of the predetermined points by determining how far the vehicle 17 has traveled from the starting point of the route.

In concluding the detailed description, it should be noted that the terminology "preferred embodiment" herein means the one embodiment currently believed by the inventor(s) to be the best embodiment of a plurality of possible embodiments. Moreover, it will be obvious to those skilled in the art that many variations and modifications may be made to the preferred embodiment(s) without substantially departing from the principles of the present invention. All such variations and modifications are intended to be included herein within the teachings of the present invention in this document and to be protected by the scope of the following claims.

What is claimed is:

1. A vehicle apparatus for use in connection with an advance notification system, the advance notification system for providing notice to a party of an impending arrival of a mobile vehicle at a stop along a route to enable delivery and/or pickup of an item at the stop, the apparatus comprising:

(a) a sensor configured to determine a current location value indicating a current location of said mobile vehicle;

(b) a storage device configured to store predetermined location values corresponding with locations along said route, said predetermined location values respectively associated with corresponding time values;

(c) a communications device configured to communicate with a remote computer associated with said advance notification system;

(d) a processor on said vehicle and electrically connected to said sensor, said storage device, and said communications device, said processor being programmed to perform the following steps:

(1) associating a current time and one of said predetermined location values with said current location of said mobile vehicle;

(2) comparing said current time with one of said time values that corresponds with said one of said location values;

(3) determining whether said vehicle is off schedule based upon said one of said location values, said one of said time values, said current location value, and said current time; and (4) when said vehicle is off schedule by at least a predefined amount, causing said communications device to communicate to the remote computer associated with the advance notification system an indication that said vehicle is off schedule by a specified time period and/or a specified distance, thus enabling said remote computer to change when said party is contacted by the advance notification system.

2. The apparatus of claim 1, wherein said processor is further programmed to perform the step of:

(5) transmitting a start signal to the remote computer associated with the advance notification system in response to a determination that said mobile vehicle is a predetermined distance from a particular location.

3. The apparatus of clam 1, wherein said sensor is further configured to receive positioning signals from a plurality of satellites.

4. The apparatus of claim 1, wherein said processor is further programmed to perform the step of:

(5) creating a vehicle schedule by performing the following steps while said mobile vehicle travels along said route:

(i) determining said one location value based on said sensor;

(ii) storing said one location value in said storage device, said one location value indicative of a location of said vehicle during said determining step;

(iii) associating said one time value with said one location value; and (iv) storing said one time value in said storage device.

5. The apparatus of claim 1, wherein step (d)(3) includes the step of:

comparing said current location value and/or said current time with said one of said predetermined location values and/or said one of said time values to determine to what extent, if any, said vehicle is off schedule.

6. The apparatus of claim 1, wherein said processor is further programmed to perform the steps of:

(5) determining whether said communications device has transmitted another indication to the remote computer within a predefined time period; and (6) defining, based on said determining step (5), said indication that is communicated to said remote computer via said causing step (4).

7. The apparatus of claim 6, wherein said processor is further configured to perform the step of:

(7) changing said predefined time period while said mobile vehicle travels along route.

8. The apparatus of claim 1, further comprising:

(e) a telephone interface electrically connected to said remote computer; and (f) a remote processor associated with said remote computer, said remote processor programmed to cause said telephone interface to make a telephone call to said party in response to a determination by said remote processor, based on said indication, that said mobile vehicle is at a predefined proximity from said stop.

9. The apparatus of claim 8, wherein said communications device is configured to communicate either over a voice channel or a control channel, depending upon an instruction received by said remote computer, to communicate said indication.

10. The apparatus of claim 9, wherein said control channel uses a feature request function signal.

11. The apparatus of claim 9, wherein said control channel uses a mobile identification number (MIN) signal.

12. The apparatus of claim 9, wherein said control channel uses an electronic serial number (ESN) signal.

13. The apparatus of claim 1, wherein said processor is further programmed to perform the following steps:

(5) determining when said vehicle starts said route after said vehicle schedule is created; and (6) waiting a predefined time period and then contacting said remote computer to advise said remote computer that said vehicle is now moving.

14. The apparatus of claim 1, further comprising a means for enabling said predefined amount to be selected by human interaction directly with said apparatus on said vehicle.

15. The apparatus of claim 1, wherein said communications device transmits cellular signals.

16. The apparatus of claim 1, wherein said processor is further programmed to perform the following steps:

(5) monitoring any deviation of said vehicle from said route; and (6) notifying said remote computer of said deviation when said deviation is greater than a predefined distance.

17. The apparatus of claim 16, further comprising means for enabling said predefined distance to be selected.

18. The apparatus of claim 1, wherein said storage device includes values defining a geographical region and said processor is further programmed to perform the following steps:

(5) determining whether said vehicle is outside of said geographical region based on said current location value; and (6) transmitting an alarm signal in response to a determination that said vehicle is outside of said geographical region.

19. The system of claim 1, further comprising:

(e) a remote processor associated with said remote computer, said remote processor programmed to determine, based on said indication, when said mobile vehicle is within a predefined proximity of said stop, said remote processor further programmed to initiate a notification message to said party when said remote processor determines that said mobile vehicle is within said predefined proximity.

20. A vehicle apparatus for use on a vehicle in connection with a vehicle tracking system, the apparatus comprising:

a sensor configured to determine a current location value of said vehicle, said current location value indicating a current location of said vehicle;

a storage device configured to store a plurality of entries, each entry having a predetermined location value corresponding with a respective location along said route and said each entry also having a predetermined time value associated with said predetermined location value;

a clock device having a current time value;

a communicator configured to communicate wireless signals; and a processor configured to select one of said plurality of entries and to determine whether said vehicle is off schedule based on said one of said entries, said current location value, and said current time value, said processor further configured to transmit a wireless signal via said communicator in response to a determination that said vehicle is off schedule.

21. The apparatus of claim 20, wherein said system includes a remote computer configured to receive said wireless signal and to determine that said mobile vehicle is off schedule in response to said wireless signal.

22. The apparatus of claim 20, wherein said predetermined location values are determined by said sensor as said vehicle travels along said route.

23. The apparatus of claim 20, wherein said communicator is configured to communicate said wireless signal over a cellular voice channel or a cellular control channel.

24. The apparatus of claim 20, wherein said processor is further configured to determine a deviation indicator indicating a distance said current location is from said route and to transmit an alarm signal via said communicator in response to a determination that said distance exceeds a threshold value.

25. The apparatus of claim 20, wherein said processor is further configured to monitor any deviation of said vehicle from said route and to notify a remote computer of said deviation when said deviation is greater than a predefined distance.

26. The apparatus of claim 20, wherein:

said storage device includes values defining a geographical region; and said processor is further configured to determine whether said vehicle is outside of said geographical region based on said current location value of said vehicle and to transmit an alarm signal in response to a determination that said vehicle is outside of said geographical region.

27. The apparatus of claim 20, wherein said current time value indicates an amount of time that has lapsed since said vehicle began said route.

28. The apparatus of claim 20, wherein said processor is configured to select said one of said entries based on said current time value.

29. The apparatus of claim 28, wherein said processor is configured to determine whether said vehicle is off schedule by comparing said current location value to said predetermined location value.

30. The apparatus of claim 20, wherein said processor is configured to select said one of said entries based on said current location value.

31. The apparatus of claim 30, wherein said processor is configured to determine whether said vehicle is off schedule by comparing said current time value to said predetermined time value.

32. The system of claim 20, further comprising:

a remote processor configured to determine, based on said wireless signal, when said vehicle is within a predefined proximity of a particular location, said remote processor further programmed to initiate a notification message in response to a determination, by said remote processor, that said vehicle is within said predefined proximity.

33. A method for a vehicle apparatus that is used in connection with an advance notification system, the advance notification system for providing notice to a party of an impending arrival of a mobile vehicle at a stop along a route to enable delivery and/or pickup of an item at the stop, the apparatus comprising a satellite receiver for receiving positioning signals, a storage device, a communications device, and a processor electrically connected to the foregoing, the method comprising the steps of:

(a) storing a plurality of location values in said storage device, said plurality of location values corresponding with locations along said route;

(b) storing a plurality of time values in said storage device, each of said plurality of time values corresponding respectively with said plurality of location values;

(c) receiving said positioning signals;

(d) associating a current time and one of said plurality of locations values with a current location of said vehicle;

(e) comparing said current time with one of said time values corresponding with said one of said location values;

(f) determining whether said vehicle is off schedule based upon said one of said location values, said one of said time values, said positioning signals, and said comparing step; and (g) when said vehicle is off schedule by at least a predefined amount, causing said communications device to communicate to the remote computer associated with the advance notification system an indication that said vehicle is off schedule by a specified time period and/or a specified distance, thus enabling said remote computer to change when said party is contacted by the advance notification system.

34. The system of claim 33, further comprising the steps of:

determining, based on said indication communicated to the remote computer, when said mobile vehicle is within a predefined proximity of said stop; and initiating a notification message to said party in response to said step of determining when said mobile vehicle is within a predefined proximity of said stop.

* * * * *